United States Patent [19]

Doetsch et al.

[11]  4,400,367
[45]  Aug. 23, 1983

[54] HYDROGEN PEROXIDE ADDUCT AND PROCESS FOR PREPARATION AND USE THEREOF

[75] Inventors: Werner Doetsch, Bad Hoenningen; Helmut Honig, Gelting; Rudolf Siegel, Neuwied, all of Fed. Rep. of Germany

[73] Assignee: Peroxid-Chemie GmbH, Hoellriegelskreuth, Fed. Rep. of Germany

[21] Appl. No.: 427,313

[22] Filed: Sep. 29, 1982

[30] Foreign Application Priority Data

Oct. 16, 1981 [DE] Fed. Rep. of Germany ....... 3141152

[51] Int. Cl.³ .............................................. C01B 17/46
[52] U.S. Cl. .................................... 423/463; 8/108 R; 252/94; 423/518; 423/582
[58] Field of Search ......................... 423/463, 518, 582

[56] References Cited

U.S. PATENT DOCUMENTS 3,979,313  9/1976  Nakagawa et al. ................ 423/582
4,005,182  1/1977  Ito et al. ............................. 423/582

*Primary Examiner*—O. R. Vertiz
*Assistant Examiner*—Wayne A. Langel
*Attorney, Agent, or Firm*—Schwartz, Jeffery, Schwaab, Mack, Blumenthal & Koch

[57] ABSTRACT

Disclosed is an adduct of the formula $4Na_2SO_4.2H_2O_2.KCl$ and a process for the preparation of this adduct by crystallizing the adduct out of a suspension containing from about 100 to 900 g of hydrogen peroxide per liter of solution and a quantity of sodium sulphate and potassium chloride which exceeds the saturation concentration of the adduct at the crystallization temperature, whereby the weight ratio of sodium sulphate to potassium chloride is in the range of from about 2:1 to 12:1. A continuous process is also disclosed for producing the adduct.

7 Claims, No Drawings

HYDROGEN PEROXIDE ADDUCT AND PROCESS FOR PREPARATION AND USE THEREOF

BACKGROUND OF THE INVENTION

The present invention relates to an adduct of hydrogen peroxide, sodium sulphate and potassium chloride, to a process for its preparation and to the use of this adduct.

An adduct of the formula $4Na_2SO_4.2H_2O_2.NaCl$ is known from DE-OS No. 25 30 539. This adduct is prepared by allowing sodium sulphate to react with hydrogen peroxide at a concentration of 70 to 800 g/l in aqueous solution in the presence of sodium chloride at a concentration of 20 to 300 g/l and at a temperature between 0° and 50° C. In this process a relatively high hydrogen peroxide concentration must be used when the sodium chloride concentration is low and vice versa.

As a crystallographic examination shows (*J.C.S. Chem. Comm.* 1978, p. 288–9), the adduct has a clathrate structure: $H_2O_2$ is incorporated in a cage formed from sulphate-oxygen atoms. The Na ions of the adduct do not have a uniform coordination. Whereas 8 of the 9 Na ions are each surrounded by 5 oxygen atoms and 1 choride ion in a distorted octahedral arrangement, the ninth Na ion is surrounded by oxygen atoms in a tetragonal prismatic arrangement. On the whole, the adduct therefore has a rather complicated structure. The mutual arrangement and coordination of the ions of sodium, sulphate and chlorine is alone capable of forming the voids (cages) which exactly match the dimensions of the $H_2O_2$ modecule and which account for the stability of the clathrate.

It was to be expected that the substitution of one type of ion by another, a fourth type, particularly a larger type of ion, would not allow the complex cage structure to form or else would expand the cage structure and drastically reduce the stability of the clathrate. Indeed, no indication at all can be derived from DE-OS No. 25 30 539 that such a modification might be possible. The expectation that the incorporation of a fourth type of ion would not lead to the formation of stable adducts is confirmed by the above-mentioned literature reference taken from *J.C.S. Chem. Comm.*, according to which all attempts to incorporate other alkali metal halides in the complex have failed.

SUMMARY OF THE INVENTION

It is therefore an object of the present invention, contrary to the prejudice of the state of the art, to provide a modified hydrogen peroxide adduct.

A further object of the invention is to provide an industrially applicable process, in particular a continuous process for preparation of the new adduct.

Another object of the invention resides in providing improved active oxygen-containing compositions, e.g., bleaching agents, sterilizing agents or oxidizing agents.

In accomplishing the foregoing objects, there has been provided in accordance with one aspect of the present invention an adduct of the formula $4Na_2SO_4.2H_2O_2.KCl$.

According to another aspect of the invention, there has been provided a process for the preparation of the adduct as defined above, comprising the step of crystallizing the adduct out of a suspension containing from about 100 to 900 g of hydrogen peroxide per liter of solution and a quantity of sodium sulphate and potassium chloride which exceeds the saturation concentration of the adduct at the crystallization temperature, whereby the weight ratio of sodium sulphate to potassium chloride is in the range of from about 2:1 to 12:1. According to a particularly preferred aspect of the invention, a continuous process for preparing the above-defined adduct has been provided.

Further objects, features and advantages of the present invention will become apparent from the detailed description of preferred embodiments which follows.

DETAILED DESCRIPTION OF PREFERRED EMBODIMENTS

Surprisingly, contrary to expectations and contrary to the existing prejudice, it was in fact possible to replace the Na ion of sodium chloride in the adduct by the K ion, having an ionic radius which is about 40% larger than that of Na. This produces an adduct of the formula $4Na_2SO_4.2H_2O_2.KCl$.

The adduct according to the invention is prepared by crystallizing it out of a suspension containing from about 100 to 900 g, preferably from about 200 to 500 g of hydrogen peroxide per liter of solution and a quantity of sodium sulphate and potassium chloride which exceeds the saturation concentration of the adduct at the crystallization temperature, whereby the weight ratio of sodium sulphate to potassium chloride is in the range of from about 2:1 to 12:1, preferably from about 3:1 to 7:1. Crystallization is carried out preferably at a temperature of from about 0° to 60° C.

One important aspect of the invention resides in the provision of a continuous process for the preparation of the adduct containing potassium chloride.

This continuous process is characterized by the following preferred steps:

(a) into a reaction vessel containing a suspension which contains from about 100 to 900 g, preferably from about 200 to 500 g hydroden peroxide per liter and a quantity of sodium sulphate and potassium chloride which exceeds the saturation concentration of the adduct at the crystallization temperature, whereby the weight ratio of sodium sulphate to potassium chloride is in the range of from about 2:1 to 12:1, preferably from about 3:1 to 7:1, continuously metering (a1) recycled mother liquor, the concentration of which has been increased with hydrogen peroxide to a content of from about 100 to 900, preferably from about 200 to 500 g/l, and (a2) solid sodium sulphate and solid potassium chloride in a weight ratio of from about 2:1 to 12:1 and in a total quantity which is sufficient to exceed the saturation concentration of the adduct at the crystallization temperature;

(b) adjusting the temperature in the reaction vessel to between about 15° and 60° C.;

(c) transferring the suspension continuously from the reaction vessel into a crystallization vessel;

(d) adjusting the temperature in the crystallization vessel to between about 0° and 60° C.;

(e) withdrawing the suspension continuously from the crystallization vessel and separating it into crystalline product and mother liquor, whereby (f) the average residence time in the reaction vessel and crystallization vessel is at least about 15 minutes;

(g) recycling the mother liquor to stage (a); and (h) passing the separated crystalline product to a drying stage.

The saturation concentration at any particular crystallization temperature can be determined quickly by means of a preliminary test. The determination of the saturation concentration for a defined hydrogen peroxide concentration at various temperatures is given in Example 3.

Unlike the process of DE-OS No. 25 30 539 for the preparation of the adduct containing NaCl, in which the ratio of $NaCl:H_2O_2$ during production is evidently critical, the corresponding ratio of $KCl:H_2O_2$ during the preparation of the adduct containing KCl according to the present invention is less important.

The weight ratio of $Na_2SO_4$ to KCl, which should be in a range of from about 2:1 to 12:1, preferably from about 3:1 to 7:1 is, on the other hand, much more important. It can be clearly seen from Example 4 that, on departing from this optimum range, the active oxygen content of the resulting product falls drastically. This discovery is surprising and was not to be anticipated from the state of the art.

An anhydrous grade of sodium sulphate is used in preference, although hydrated sulphate can also be used. In this case, it should be noted that the $Na_2SO_4:KCl$ ratio is to be calculated on the basis of the anhydrous quantities.

The salts $Na_2SO_4$ and KCl to be metered for the reaction are metered preferably in solid form into the reaction vessel. In this connection, it is possible to mix the salts beforehand in the ratio to be used and to meter them together. Another variant involves metering the solid salts individually.

By continuous transfer of solution or suspension is meant not only constant, uninterrupted transfer but also an alternative process variant whereby portions are transferred periodically, e.g., from the reaction vessel into the crystallization vessel such that the level of filling in the reaction vessel varies periodically, e.g., between 70% and 100%.

Temperature control in the process according to the invention is not particularly critical. It has, however, proved to be advantageous to operate at a higher temperature in the mixing stage than in the crystallization stage. In this way, homogeneous mixing of the reaction mixture is achieved.

The average residence time in the reaction vessel and crystallization stage is constrained by two parameters. Short residence times yield products with only a low active oxygen content. This method of operating therefore yields adducts with the composition of $4Na_2SO_4.nH_2O_2.KCl$, where n assumes values less than 2. A residence time of at least 15 minutes is generally needed to prepare adducts with n=2; however, longer residence times have no further effect on the $H_2O_2$ content of the adduct. Longer residence times do, however, affect the average grain size of the adduct, i.e., larger crystals are obtained with longer residence times. It is therefore easily possible to vary the grain size range by optimizing the residence time in the crystallization stage.

The suspension withdrawn from the crystallization stage is separated in the conventional way into crystalline product and mother liquor (e.g., by filtration or centrifuging). The mother liquor is concentrated and recycled.

In a particular process variant, crystallization is carried out in the presence of conventional, preferably alkali-free peroxygen stabilizers. These are added most favorably in quantities from about 0.05 to 2% by weight, based on the weight of 100% $H_2O_2$, and are metered advantageously together with the $H_2O_2$.

Acids of an inorganic or organic nature can be mentioned by way of example from the large number of known alkali-free stabilizers, such as phosphoric acid, quinolinic acid, salicylic acid, dipicolinic acid (DPA), chelating agents such as 8-hydroxyquinoline or ethylenediaminetetraacetic acid (EDTA) or phosphonic acid derivatives such as aminotri-(alkylidenephosphonic acid), ethylenediaminetetra-(methylenephosphonic acid), alkylidene-diphosphonic acid, or their salts such as, e.g., ethane-1-hydroxy-1,1-diphosphonate (EHDP).

Particularly good results are obtained with stabilizers based on phosphonic acid, particularly with EHDP.

The crystalline product is dried in a conventional way, e.g., in a fluidized bed at substance temperatures of from about 40° to 80° C. If a defined grain size range is desired, a screening stage can be added on as well. With this variant, fine or coarse milled material is recycled to the crystallization stage.

The adduct prepared according to the invention has excellent properties in terms of active oxygen stability (temperature stability, dry and wet stability), abrasion resistance, pourability and rate of dissolution.

Surprisingly, the product provided with small quantities of a stabilizer according to a particular variant of the process exhibits increased temperature stability, i.e., the decomposition temperature is even higher than that of the known adduct containing NaCl.

The adduct prepared according to the invention is used as an active oxygen carrier in bleaching agents, oxidizing agents or sterilizing agents, preferably in dry bleach systems.

The purpose of the examples below is to illustrate the invention in more detail without limiting its scope.

EXAMPLE 1

A quantity of 120 g KCl and 780 g $Na_2SO_4$ was added, with stirring, to 1.2 liters of an aqueous $H_2O_2$ solution (333 g/l $H_2O_2$), stabilized with 4.8 ml EHDP, contained in a glass beaker (capacity 2 liters).

The mixture was stirred for 30 minutes at a temperature of 20° C. and then cooled at 4° C. with further stirring.

The resulting suspension was separated into crystalline product and mother liquor by filtration under suction. The moist crystalline product was dried in a fluidized bed drier having a temperature of 60° C. at the bottom of the bed.

The KCl clathrate thus obtained had the following analysis:

| | |
|---|---|
| Active oxygen | 4.4% |
| KCl | 10.3% |
| $Na_2SO_4$ | 80.3% |
| Bulk density | 0.85 kp/l |
| Abrasion | 4.0% |
| Loss of stability | |
| - wet test | 0.91 |
| - dry test | 0.91 |
| Solubility at 15° C. | |
| after 1 minute | 100% |
| Decomposition temperature | 210° C. |
| Grain size analysis | |
| >0.42 mm | 4.9% |
| 0.42–0.15 mm | 76.8% |
| 0.15–0.053 mm | 17.7% |
| <0.053 mm | 0.6% |

EXAMPLE 1a

Operations were carried out as in Example 1, without cooling to 4° C. for crystallization. The resulting adduct had essentially the same properties.

EXAMPLE 2

A quantity of 150 g KCl and 600 g $Na_2SO_4$ was added, with stirring, to 1 liter of an aqueous $H_2O_2$ solution (33% by weight, stabilized with 4.8 ml EHDP) contained in a first glass beaker (I) (capacity 3 l).

Stirring was carried out for 30 minutes at a temperature of 20° C. One third (⅓) of the volume was transferred to a second glass beaker (II) (capacity 2 l) in which the mixture was cooled to 4° C. with further stirring. Subsequent treatment of the cooled suspension took place in the manner described in Example 1.

The concentration of the mother liquor obtained in this case, which contained 214 g/l $H_2O_2$, 279 g/l $Na_2SO_4$ and 97 g/l KCl was increased to 333 g/l with $H_2O_2$ solution (approximately 900 g/l $H_2O_2$) and recycled to the reaction vessel. $Na_2SO_4$ and KCl were added to this in such quantity that the original concentrations of 150 g/l KCl and 600 g/l $Na_2SO_4$ were achieved.

An operating temperature of 24° C. was maintained in glass beaker I without external cooling.

The test time was 9 hours. The samples taken every hour had the following analysis:

| TIME (hrs) | 1 | 2 | 3 | 4 | 5 | 6 | 7 | 8 | 9 |
|---|---|---|---|---|---|---|---|---|---|
| Active Oxygen (%) | 4.36 | 4.32 | 4.32 | 4.36 | 4.36 | 4.36 | 4.40 | 4.40 | 4.42 |
| Bulk density (kp/l) | 0.80 | 0.77 | 0.80 | 0.85 | 0.83 | 0.88 | 0.84 | 0.87 | 0.87 |
| KCl | | | | | | 10.6 | 10.6 | 10.6 | 10.5 |
| $Na_2SO_4$ | | | | | | 80.0 | 80.0 | 80.0 | 80.1 |
| Loss of stability I Wet test | 3.2 | | | | 2.06 | | | 1.09 | 1.4 |

EXAMPLE 3

Determination of the supersaturation concentration.

Adduct prepared according to Example 1 was introduced with stirring into 30% by weight, temperature adjusted $H_2O_2$ until a solid phase remained. The supernatent solution was analyzed for its chloride content. The results are given in the Table below.

| °C. | KCl g/l | Adduct calculated from KCl |
|---|---|---|
| 1 | 38.7 | 368.9 |
| 5 | 39.5 | 376.5 |
| 10 | 40.2 | 383.2 |
| 15 | 40.2 | 383.2 |
| 20 | 39.8 | 379.4 |
| 25 | 40.2 | 383.2 |
| 30 | 40.2 | 383.2 |

EXAMPLE 4

The operating procedure was as in Example 1a.

| 1st Variation: | 75 g KCl<br>75 g $Na_2SO_4$ | = ratio 1:1 |
|---|---|---|

The adduct had an active oxygen content of 2.0%.

| 2nd Variation: | 10 g KCl<br>140 g $Na_2SO_4$ | = ratio 14:1 |
|---|---|---|

The adduct had an active oxygen content of 2.1%.

EXAMPLE 5

The active oxygen content of the product after the various residence times in the reaction vessel and crystallization stage is given in the following Table (operating procedure as in Example 1a).

| Residence Time (minutes) | Crystals, % active oxygen |
|---|---|
| 5 | 0.28 |
| 8 | 0.32 |
| 10 | 0.72 |
| 15 | 3.84 |
| 25 | 4.36 |
| 40 | 4.32 |
| 50 | 4.32 |
| 60 | 4.32 |

EXAMPLE 6

The relationship between the loss of stability and the amount of stabilizer introduced into the $H_2O_2$ is given in the following Table (operating procedure as in Example 2).

| Addition of EHDP based on 100% $H_2O_2$ | Loss of stability in % (wet test) |
|---|---|
| 1.5% | 1.34 |
| 1.2% | 1.4 |
| 0.6% | 3.7 |
| 0.15% | 4.2 |
| 0.075% | 4.7 |
| 0.02% | 33.8 |

The following test procedures were used to determine the product parameters.

Abrasion resistance

A test quantity of granules which had been screened beforehand over a DIN 30 sieve was treated for 15 minutes in a cylinder rotating at 145 rpm half filled with lead shot 5 mm in diameter. The granules were then screened again. The percentage of resulting fine material below 0.053 mm is the abrasion.

Wet test

A quantity of 1 g of granules was dissolved in 1.67 ml $H_2O$ in a test tube that had been specially cleaned and the tube then placed in a thermostat at 60° C. for 20 minutes. The sample was then transferred quantitively with dilute $H_2SO_4$ into an Erlenmeyer flask and the active oxygen determined by redox titration. The oxygen loss of the granules in percent is the loss of stability.

Dry test

For this test, 10 g of granules were weighed into a glass dish (internal diameter 80 mm, height 20 mm) and the thermal loss of stability determined after 2 hours at 54° C. (drying chamber). The active oxygen loss of the granules as a relative percentage is the loss of stability.

Solubility 2 g of the adduct produced according to Example 1 are added to 1 liter of water at 15° C. A solubility of "100%" is achieved if the adduct is fully dissolved after 1 minute of stirring.

What is claimed is:

1. An adduct of the formula $$4Na_2SO_4 \cdot 2H_2O_2 \cdot KCl.$$

2. A process for the preparation of the adduct as defined by claim 1, comprising the step of: crystallizing the adduct out of a suspension containing from about 100 to 900 g of hydrogen peroxide per liter of solution and a quantity of sodium sulphate and potassium chloride which exceeds the saturation concentration of the adduct at the crystallization temperature, whereby the weight ratio of sodium sulphate to potassium chloride is in the range of from about 2:1 to 12:1.

3. A process according to claim 2, wherein the suspension contains from about 200 to 500 g of hydrogen peroxide per liter.

4. A process according to claim 2 or 3, wherein the crystallization step is carried out at a temperature of from about 0° to 60° C.

5. A continuous process for the preparation of the adduct as defined by claim 1, comprising the steps of:
   (a) into a reaction vessel containing a suspension containing from about 100 to 900 g of hydrogen peroxide per liter of solution and a quantity of sodium sulphate and potassium chloride which exceeds the saturation concentration of the adduct at the crystallization temperature, whereby the weight ratio of sodium sulphate to potassium chloride is in the range of from about 2:1 to 12:1, continuously metering
      (a1) a recycled mother liquor from step (e) below, to which has been added an amount of hydrogen peroxide sufficient to raise the $H_2O_2$ concentration to a level between about 100 and 900 g/l, and
      (a2) solid sodium sulphate and solid potassium chloride in a weight ratio of from about 2:1 to 12:1 and in a total quantity which is sufficient to exceed the saturation concentration of the adduct at the crystallization temperture.
   (b) adjusting the temperature in the reaction vessel to a level of from about 15° to 60° C.;
   (c) transferring the suspension continuously from the reaction vessel into a crystallization vessel;
   (d) adjusting the temperature in the crystallization vessel to a level of from about 0° to 60° C.;
   (e) withdrawing the suspension continuously from the crystallization vessel and separating it into crystalline product and mother liquor, whereby the average residence time in the reaction vessel and crystallization vessel is at least about 15 minutes;
   (f) recycling the mother liquor to step (a); and
   (g) passing the separated crystalline product to a drying stage.

6. A process according to claim 2 or 5, wherein crystallization is carried out in the presence of from about 0.05 to 2% by weight, based on 100% $H_2O_2$, of a peroxygen stabilizer.

7. A process according to claim 6, wherein said peroxygen stabilizer comprises an alkali-free stabilizer.

* * * * *